US012387890B2

(12) United States Patent
Invernizzi et al.

(10) Patent No.: US 12,387,890 B2
(45) Date of Patent: Aug. 12, 2025

(54) MEDIUM VOLTAGE SWITCHING APPARATUS

(71) Applicant: ABB Schweiz AG, Baden (CH)

(72) Inventors: Pierluigi Invernizzi, Corna Imagna (IT); Simone Rambaldini, Paderno Dugnano (IT); Roberto Tassis, San Giovanni Bianco (IT)

(73) Assignee: ABB Schweiz AG, Baden (CH)

(*) Notice: Subject to any disclaimer, the term of this patent is extended or adjusted under 35 U.S.C. 154(b) by 213 days.

(21) Appl. No.: 18/317,496

(22) Filed: May 15, 2023

(65) Prior Publication Data

US 2023/0368993 A1 Nov. 16, 2023

(30) Foreign Application Priority Data

May 16, 2022 (EP) .................................... 22173528

(51) Int. Cl.
*H01H 33/02* (2006.01)
*H01H 33/664* (2006.01)

(52) U.S. Cl.
CPC ........ *H01H 33/664* (2013.01); *H01H 33/025* (2013.01)

(58) Field of Classification Search
CPC ............. H01H 33/664; H01H 33/6661; H01H 33/666; H01H 33/025; H01H 33/122; H01H 2033/6667; H01H 31/003; H01H 31/28
USPC ......................... 218/118, 126, 140, 153, 154
See application file for complete search history.

(56) References Cited

U.S. PATENT DOCUMENTS

| | | | | |
|---|---|---|---|---|
| 3,824,359 A * | 7/1974 | Date | H01H 33/127 | 218/10 |
| 7,091,439 B2 * | 8/2006 | Vaghini | H01H 33/125 | 218/7 |
| 9,058,948 B2 * | 6/2015 | Grosjean | H01H 33/126 | |
| 9,679,724 B2 * | 6/2017 | Abrahamsen | H01H 33/128 | |
| 2002/0066655 A1 * | 6/2002 | Theaudiere | H01H 9/104 | 200/47 |

(Continued)

FOREIGN PATENT DOCUMENTS

| | | | |
|---|---|---|---|
| FR | 3044162 A1 | 5/2017 | |
| WO | 2017011370 A1 | 1/2017 | |

OTHER PUBLICATIONS

European Extended Search Report, Application No. 22173528.5, dated Oct. 17, 2022, 5 pps.

*Primary Examiner* — William A Bolton
(74) *Attorney, Agent, or Firm* — McCarter & English, LLP; Michael M. Gnibus

(57) ABSTRACT

A switching apparatus including one or more electric poles. For each electric pole, the switching apparatus includes a first pole terminal, a second pole terminal, and a ground terminal. The switching apparatus further includes a plurality of fixed contacts spaced apart one from another, a movable contact, which is reversibly movable about a corresponding rotation axis according to opposite first and second rotation directions, so that said movable contact can be coupled to or uncoupled from one or more of the above-mentioned fixed contacts, a vacuum interrupter including a vacuum chamber, in which a fixed arc contact and a movable arc contact are enclosed and can be coupled or separated, and a motion transmission mechanism operatively coupled to the movable arc contact of said vacuum interrupter.

15 Claims, 20 Drawing Sheets

(56) References Cited

U.S. PATENT DOCUMENTS

| | | | | |
|---|---|---|---|---|
| 2012/0048692 | A1 | 3/2012 | Piccoz et al. | |
| 2013/0187732 | A1* | 7/2013 | Bullock ............. | H01H 33/6662 335/6 |

* cited by examiner $P_A$, $C_1$, $P_3$, closed state $P_B$, $C_2$, $P_4$, open state $P_C$, $C_2$, $P_4$, grounded state

MEDIUM VOLTAGE SWITCHING APPARATUS

CROSS REFERENCE TO RELATED APPLICATIONS

This patent application claims the benefit and priority of European Patent Application No. 22173528.5 filed on May 16, 2022, the disclosure of which is incorporated by reference herein in its entirety as part of the present application.

BACKGROUND

The present disclosure relates to a switching apparatus for medium voltage electric systems, more particularly to a load-break switch for medium voltage electric systems.

Load-break switches are well known in the state of the art.

These switching apparatuses, which are generally used in secondary distribution electric grids, are capable of providing circuit-breaking functionalities (namely breaking and making a current) under specified circuit conditions (typically nominal or overload conditions) as well as providing circuit-disconnecting functionalities (namely grounding a load-side section of an electric circuit).

Most traditional load-break switches of the state of the art have their electric poles immersed in a sulphur hexafluoride (SF6) atmosphere as this insulating gas ensures excellent performances in terms of dielectric insulation between live parts and arc-quenching capabilities when currents are interrupted.

As is known, however, SF6 is a powerful greenhouse gas and its usage is subject to severe restriction measurements for environmental preservation purposes. For this reason, over the years, there has been made a considerable effort to develop and design load-break switches not employing SF6 as an insulating gas.

Some load-break switches have been developed, in which electric poles are immersed in pressurized dry air or other environment-friendly insulation gases, such as mixtures of oxygen, nitrogen, carbon dioxide, and/or fluorinated gases. Unfortunately, the experience has shown that these switching apparatuses generally do not show fully satisfactory performances, particularly in terms of arc-quenching capabilities.

Other currently available load-break switches employ, for each electric pole, different contact arrangements electrically connected in parallel between the pole terminals.

A contact arrangement has electric contacts operating in an atmosphere filled with an environment-friendly insulating gas or air and it is designed for carrying most of the current flowing along the electric pole as well as driving possible switching maneuvers.

Another contact arrangement, instead, has electric contacts operating in a vacuum atmosphere and it is specifically designed for quenching the electric arcs arising when the current flowing along the electric pole is interrupted.

These last switching apparatuses have proven to ensure a relatively low environmental impact while providing, at the same time, high-level performances in terms of dielectric insulation and arc-quenching capabilities. However, until now, they adopt complicated solutions to manage and coordinate the operation of the above-mentioned multiple contact arrangements. Therefore, they still offer poor performances in terms of structural compactness and reliability in operation.

BRIEF DESCRIPTION

Embodiments of the present disclosure provide a switching apparatus for MV electric systems that allows solving or mitigating the above-mentioned technical problems.

More particularly, the present disclosure provides a switching apparatus ensuring high-level performances in terms of dielectric insulation and arc-quenching capabilities during the current breaking process.

Another aspect of the present disclosure provides a switching apparatus showing high levels of reliability in operation.

Another aspect of the present disclosure provides a switching apparatus having electric poles with high compactness and structural simplicity.

Another aspect of the present disclosure provides a switching apparatus that can be easily manufactured at industrial level, at competitive costs with respect to the solutions of the state of the art.

In order to fulfill these aims and aspects, the present disclosure provides a switching apparatus, according to the following claim 1 and the related dependent claims.

In a general definition, the switching apparatus of the present disclosure includes one or more electric poles.

For each electric pole, the switching apparatus includes a first pole terminal, a second pole terminal, and a ground terminal. In operation, the first pole terminal can be electrically coupled to a first conductor of an electric line, the second pole terminal can be electrically coupled to a second conductor of said electric line, and the ground terminal can be electrically coupled to a grounding conductor.

For each electric pole, the switching apparatus includes a plurality of fixed contacts spaced apart one from another. Such a plurality of fixed contacts include a first fixed contact electrically connected to the first pole terminal, a second fixed contact electrically connected to the second pole terminal, and a third fixed contact electrically connected to the ground terminal.

For each electric pole, the switching apparatus further includes a movable contact, which is reversibly movable about a corresponding rotation axis according to opposite first and second rotation directions, so that said movable contact can be mechanically and electrically coupled to or uncoupled from one or more of the above-mentioned fixed contacts.

For each electric pole, the switching apparatus further includes a vacuum interrupter, which includes a fixed arc contact electrically connected to the first pole terminal (e.g., through said first fixed contact) and a movable arc contact reversibly movable along a corresponding translation axis between a coupled position with the fixed arc contact and an uncoupled position from the fixed arc contact. The vacuum interrupter additionally includes a vacuum chamber, in which the fixed arc contact and the movable arc contact are enclosed and can be coupled or separated.

For each electric pole, the switching apparatus further includes a motion transmission mechanism mechanically coupled to the movable arc contact. Such a motion transmission mechanism is actuatable by said movable contact, when said movable contact moves about said rotation axis, in order to cause a movement of said movable arc contact along said translation axis.

The motion transmission mechanism includes a first lever pivoted at a first axis and configured to be actuated by said movable contact, during an opening maneuver of the switching apparatus.

The first lever includes a first coupling portion mechanically couplable to said movable contact, during an opening maneuver of the switching apparatus. At said first coupling portion, the first lever includes an auxiliary contact arrangement electrically connected to the movable arc contact and electrically couplable to said movable contact of the switching apparatus, when said movable contact mechanically couples to said first coupling portion.

The motion transmission mechanism includes a second lever pivoted on a fixed support at a second hinge axis and configured to be actuated by said movable contact, during a closing maneuver of said switching apparatus. The second lever includes a second coupling portion mechanically couplable to said movable contact, during an opening maneuver of the switching apparatus.

The motion transmission mechanism includes third lever pivoted on the first lever at said first hinge axis and pivoted on the movable arc contact of the vacuum interrupter at a third hinge axis.

According to an aspect of the present disclosure, said first lever is configured to actuate said second lever, when the first lever is actuated by said movable contact, during an opening maneuver of said switching apparatus.

The said first lever may include one or more first coupling surfaces configured to couple mechanically to one or more corresponding second coupling surfaces of said second lever, when said first lever is actuated by said movable contact, during an opening maneuver of said switching apparatus.

According to an aspect of the present disclosure, said second lever is configured to actuate said first lever, when said second lever is actuated by said movable contact, during a closing maneuver of said switching apparatus.

The said second lever may be hinged on said first lever at the first hinge axis.

The said first and second levers may be configured to be actuated by the movable contact of the switching apparatus, at different points of the motion trajectory of said movable contact.

The motion transmission mechanism may further include elastic means mechanically coupling said first and second levers.

The aforesaid auxiliary contact arrangement may include a plurality of conductive elements configured to be slidingly coupled with corresponding contact surfaces of the movable contact and holding means configured to press said electric contact elements against the contact surfaces of the movable contact.

The first lever and the third lever may include, respectively, first electrical connections and second electrical connections configured to connect electrically the auxiliary contact arrangement with the movable arc contact of the vacuum interrupter. Said first and second electrical connections are formed by conductors at least partially buried in an electrically insulating material of said first and third levers.

According to an aspect of the present disclosure, the aforesaid motion transmission mechanism is configured to take alternatively a first configuration, at which said movable arc contact is in said coupled position, and a second configuration, at which said movable arc contact is in said uncoupled position.

The said motion transmission mechanism may be configured to maintain stably said first configuration or said second configuration, if the first and second levers are not actuated by said movable contact.

The said motion transmission mechanism may be configured to change configuration, if said first lever or said second lever is actuated by said movable contact.

More particularly, said motion transmission mechanism is configured to switch from said first configuration to said second configuration upon an actuation of the first lever by said movable contact and it is configured to switch from said second configuration to said first configuration upon an actuation of the second lever by said movable contact.

A transition of said motion transmission mechanism from said first configuration to said second configuration causes a movement of said movable arc contact from said coupled position to said uncoupled position while a transition of said motion transmission mechanism from said second configuration to said first configuration causes a movement of said movable arc contact from said uncoupled position to said coupled position.

According to an aspect of the present disclosure, said movable contact may include at least a contact blade, more preferably a pair of parallel contact blades.

BRIEF DESCRIPTION OF THE DRAWINGS

Further characteristics and advantages of the present disclosure will emerge from the description of example, but not exclusive embodiments of the switching apparatus, according to the present disclosure, non-limiting examples of which are provided in the attached drawings, wherein.

DETAILED DESCRIPTION

Figure 1:
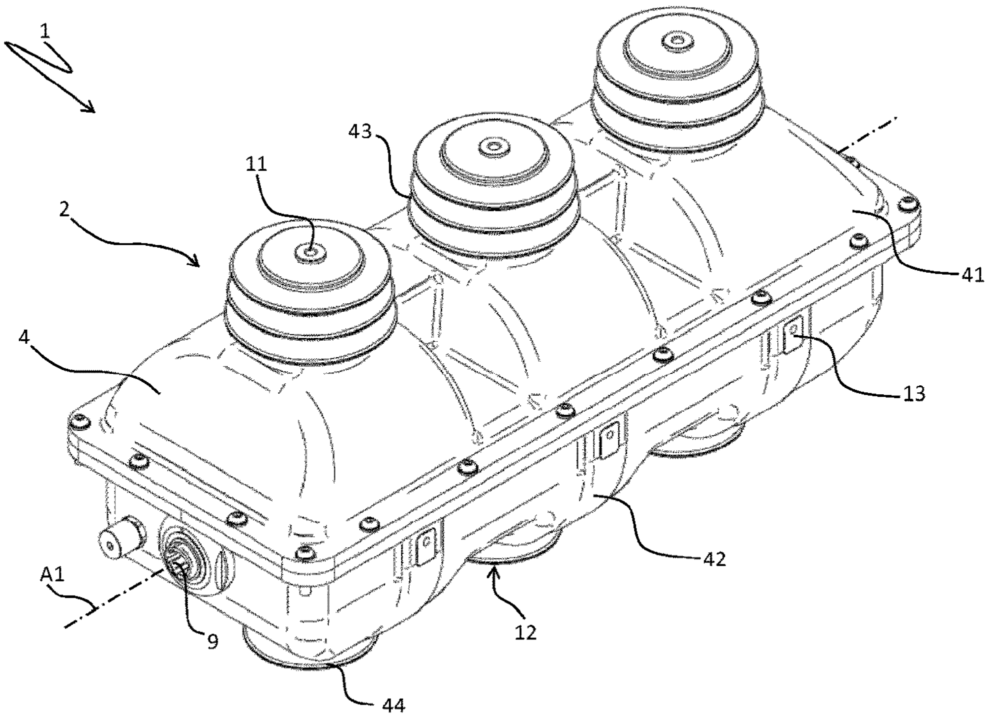
FIG. 1 shows an outer view of the switching apparatus of the present disclosure.

With reference to the figures, the present disclosure relates to a switching apparatus 1 for medium voltage electric systems.

For the purposes of the present disclosure, the term "medium voltage" (MV) relates to operating voltages at electric power distribution level, which are higher than 1 kV AC and 1.5 kV DC up to some tens of kV, e.g. up to 72 kV AC and 100 kV DC.

For the purposes of the present disclosure, the terms "terminal" and "contact" should be hereinafter intended, unless otherwise specified, as "electric terminal" and "electric contact", respectively, thereby referring to electrical components suitably arranged to be electrically connected or coupled to other electrical conductors.

The switching apparatus 1 is particularly adapted to operate as a load-break switch. It is therefore designed for providing circuit-breaking functionalities under specified circuit conditions (nominal or overload conditions) as well as circuit-disconnecting functionalities, in particular grounding a load-side section of an electric circuit.

In the following, the switching apparatus of the disclosure will be described with particular reference to this application for the sake of simplicity only and without intending to limit the scope of the disclosure.

The switching apparatus 1 includes one or more electric poles 2.

The switching apparatus 1 is of the multi-phase (e.g., three-phase) type and it may include a plurality (e.g., three) of electric poles 2.

According to the embodiments shown in the cited figures, the switching apparatus 1 may include an insulating housing 4, which conveniently defines an internal volume where the electric poles 2 are accommodated.

The insulating housing 4 may have an elongated shape (e.g., substantially cylindrical) developing along a main longitudinal axis. The electric poles 2 are arranged side by side along corresponding transversal planes perpendicular the main longitudinal axis of the switching apparatus.

The insulating housing 4 may be formed by an upper shell 41 and a lower shell 42 that are mutually joined along suitable coupling edges.

For each electric pole, the insulating housing 4 includes a first bushing 43 protruding from a top region of the upper shell 41 and a second bushing 44 protruding from a bottom region of the second shell 42 (reference is made to a normal operating positioning of the switching apparatus as shown in FIG. 1).

In the following, the switching apparatus of the disclosure will be described with particular reference to these embodiments for the sake of brevity only and without intending to limit the scope of the disclosure.

As a matter of fact, according to other embodiments of the disclosure (not shown), the switching apparatus of the disclosure may be installed in a cubicle together with other electric devices. In this case, the switching apparatus may not include a dedicated housing as shown in the cited figures.

The internal volume of the switching apparatus 1 may be filled with pressurized dry air or another insulating gas having a low environmental impact, such as a mixture of oxygen, nitrogen, carbon dioxide, and/or a fluorinated gas.

For each electric pole 2, the switching apparatus 1 includes a first pole terminal 11, a second pole terminal 12, and a ground terminal 13. The first pole terminal 11 is configured to be electrically coupled to a first conductor of an electric line (e.g., a phase conductor electrically connected to an equivalent electric power source), the second pole terminal 12 is configured to be electrically connected to a second conductor of an electric line (e.g., a phase conductor electrically connected to an equivalent electric load) while the ground terminal 13 is configured to be electrically connected to a grounding conductor.

According to the embodiments shown in the cited figures, the first pole terminal 11 is at least partially accommodated in the first bushing 43 while the second pole terminal 12 is at least partially accommodated in the second bushing 44.

For each electric pole, the first and second pole terminals 11, 12 may be arranged at opposite sides of the switching apparatus.

For each electric pole 2, the switching apparatus 1 includes a plurality of fixed contacts, which are spaced apart one from another around the main longitudinal axis of the switching apparatus. In particular, the switching apparatus 1 includes a first fixed contact 5, a second fixed contact 6, and a third fixed contact 7.

The first fixed contact 5 is electrically connected to the first pole terminal 11, the second fixed contact 6 is electrically connected to the second pole terminal 12 while the third fixed contact 7 is electrically connected to the ground terminal 13.

The switching apparatus 1 includes, for each electric pole 2, a movable contact 10 reversibly movable (along a given plane of rotation) about a corresponding rotation axis A1, which is substantially parallel to or coinciding with the main longitudinal axis of the switching apparatus.

Figure 2:
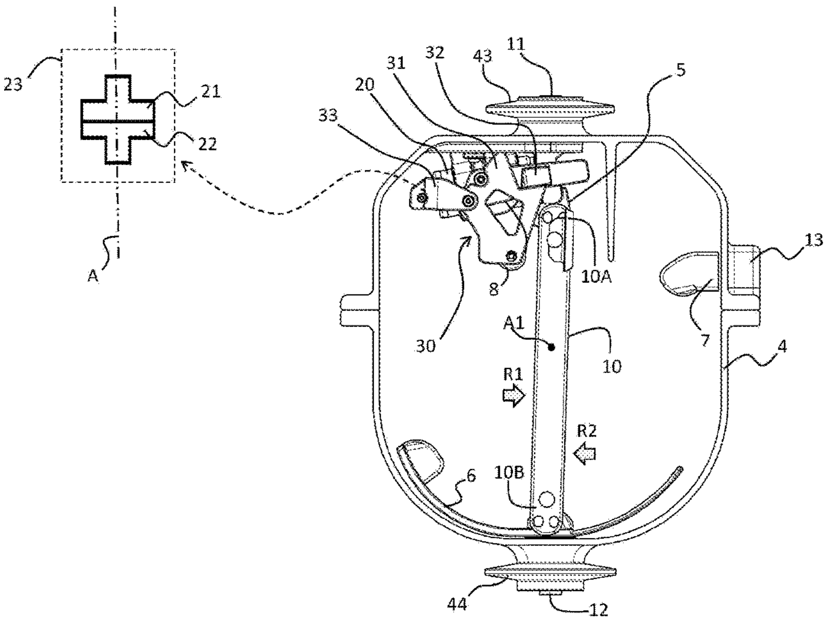
FIGS. 2-15 are schematic views partially showing the structure and operation of an electric pole of the switching apparatus of the present disclosure.

The movable contact 10 can rotate according to a first rotation direction R1, which is conveniently oriented away from the first fixed contact 5, or according to a second rotation direction R2, which is opposite to the first rotation direction R1 and is oriented towards the first fixed contact 5 (FIG. 2). With reference to the observation plane of FIGS. 2-15, the above-mentioned first rotation direction R1 is oriented counter-clockwise while the above-mentioned second rotation direction R2 is oriented clockwise.

Figure 15:
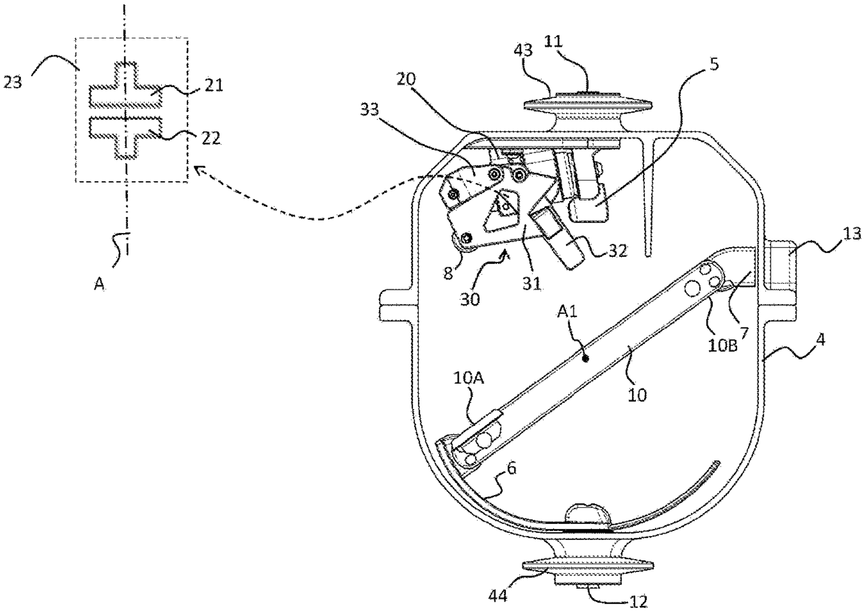

In operation, the switching apparatus 1 is capable of switching in three different operating states, namely:

- a closed state, in which each electric pole 2 has the first and second pole terminals 11, 12 electrically connected one to another and electrically disconnected from the ground terminal 13. When the switching apparatus is in a closed state, a current can flow along each electric pole 2 between the corresponding first and second pole terminals 11, 12 (FIG. 2);
- an open state, in which each electric pole 2 has the first and second pole terminals 11, 12 and the ground terminal 13 electrically disconnected one from another. When the switching apparatus is in an open state, no currents can flow along the electric poles 2 (FIG. 8); and
- a grounded state, in which each electric pole 2 has the first and second pole terminals 11, 12 electrically disconnected one from another and the second pole terminal 12 and the ground terminal 13 electrically connected one to another. When the switching apparatus is in a grounded state, no currents can flow along the electric poles 2. However, the second pole terminal 12 of each electric pole (and therefore the second line conductor connected thereto) is put at a ground voltage (FIG. 15).

In principle, the switching apparatus 1 may be of the "single-disconnection" type (not shown) or "double-disconnection" type (as shown in the cited figures) depending on how the current path through each electric pole is interrupted, when the switching apparatus reaches an open state.

If the switching apparatus is of the "single-disconnection" type, the movable contact 10 is electrically coupled to the second fixed contact 6 and is electrically decoupled from the remaining fixed contacts 5, 7 when the switching apparatus is in an open state. The current path through each electric pole is thus interrupted only at one end of the movable contact ("single-disconnection").

If the switching apparatus is of the "double-disconnection" type, the movable contact 10 is electrically decoupled from any fixed contact 5, 6, 7 when the switching apparatus is in an open state. The current path through each electric pole is thus interrupted at both ends of the movable contact ("double-disconnection").

In the following, the switching apparatus of the disclosure will be described with particular reference to the above-mentioned "double-disconnection" configuration, for the sake of brevity only and without intending to limit the scope of the disclosure.

The switching apparatus 1 is capable of carrying out different type of maneuvers, each corresponding to a transition among the above-mentioned operating states. In particular, the switching apparatus is capable of carrying out:

- an opening maneuver when it switches from a closed state to an open state;
- a closing maneuver when it switches from an open state to a closed state;

a disconnecting maneuver when it switches from an open state to a grounded state; and
a reconnecting maneuver when it switches from a grounded state to an open state.

The switching apparatus can switch from a closed state to a grounded state by carrying out an opening maneuver and subsequently a disconnecting maneuver while the switching apparatus can switch from a grounded state to a closed state by carrying out a reconnecting maneuver and subsequently a closing opening maneuver.

In order to carry out the above-mentioned maneuvers, the movable contact 10 of each electric pole is suitably driven according to the above-mentioned first rotation direction R1 or second rotation direction R2.

In particular, the movable contact 10 moves according to the first rotation direction R1 during an opening maneuver or a disconnecting maneuver of the switching apparatus and it moves according to the second rotation direction R2 during a closing maneuver or a reconnecting maneuver of the switching apparatus.

In general, the movable contact 10 of each electric pole is reversibly movable between a first end-of-run position $P_A$, which corresponds to a closed state of the switching apparatus (FIG. 2), and a second end-of-run position $P_C$, which corresponds to a grounded state of the switching apparatus (FIG. 15). Conveniently, the movable contact 10 passes through an intermediate position $P_B$, which corresponds to an open state of the switching apparatus (FIG. 8), when it moves between the first and second end-of-run positions $P_A$, $P_C$.

As it is reversibly movable about the rotation axis A1, the movable contact 10 can be mechanically and electrically coupled to or uncoupled from one or more of the fixed contacts 5, 6, 7 thereby being electrically connecting or electrically disconnecting these fixed contacts depending on the on-going maneuver.

When it is in the first end-of-run position $P_A$ (closed state of the switching apparatus), the movable contact 10 is coupled to the first fixed contact 5 and to the second fixed contact 6 and it electrically connects these fixed contacts and, consequently, the first and second pole terminals 11, 12.

When it is in the second end-of-run position $P_C$ (grounded state of the switching apparatus), the movable contact 10 is coupled to the second fixed contact 6 and to the third fixed contact 7 and it electrically connects these fixed contacts and, consequently, the second and third pole terminals 12, 13.

In the embodiment shown in the cited figures, when it is in the intermediate position $P_B$ (open state of the switching apparatus), the movable contact 10 is coupled to no fixed contacts ("double-disconnection" type).

In the switching apparatus of the disclosure, the above-mentioned fixed contacts 5, 6, 7 may be formed by corresponding pieces of conductive material, which are suitably shaped according to the needs.

The first fixed contact 5 may be formed by a blade-shaped conductive body having a contoured end coupled to the first pole terminal 11 and a blade-shaped free end for coupling to the movable contact 10.

The second fixed contact 6 may be formed by an arc-shaped conductive body extending partially around the rotation axis A1 of the movable contact 10 and having contoured ends and protrusions for coupling to the movable contact 10.

The third fixed contact 7 may be formed by a blade-shaped conductive body having a contoured end coupled to the third pole terminal 13 and a blade-shaped free end and a blade-shaped free end for coupling to the movable contact 10.

Figure 8:
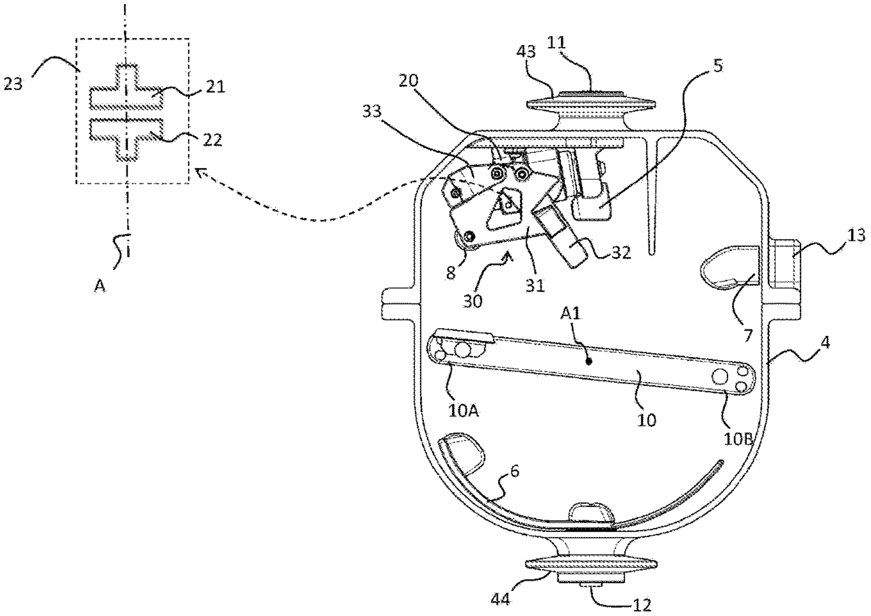

In the embodiments shown in the cited figures, the movable contact 10 has a pair of movable contact regions 10A, 10B for coupling with the fixed contacts 5, 6, 7 (FIGS. 2, 8, 15). Said contact regions are located at opposite positions relative to the rotation axis A1 of the movable contact 10 and are preferably aligned one to another along a same direction.

The movable contact 10 and the fixed contacts 5, 6, 7 may be arranged so that, in operation:

the first movable contact region 10A of the movable contact 10 can be coupled mechanically and electrically to or uncoupled from the first contact 5 and the second fixed contact 6, when the movable contact 10 moves between the first and second end-of-run positions $P_A$, $P_C$; and the second movable contact region 10B of the movable contact 10 can be coupled mechanically and electrically to or uncoupled from the second fixed contact 6 and the third fixed contact 7, when the movable contact 10 moves between the first and second end-of-run positions $P_A$, $P_C$.

When it is in the first end-of-run position $P_A$, the movable contact 10 may have the first movable contact region 10A coupled to the first fixed contact 5 and the second movable contact region 10B coupled to the second fixed contact 6. As mentioned above, in this situation, the movable contact 10 electrically connects the first and second fixed contacts 5, 6 and, consequently, the first and second pole terminals 11, 12.

As mentioned above, when it is in the intermediate position $P_B$, the movable contact 10 has no contact regions coupled to fixed contacts and it is therefore electrically disconnected from these latter.

When it is in the second end-of-run position $P_C$, the movable contact 10 may have the first movable contact region 10A coupled to the second fixed contact 6 and the second movable contact region 10B coupled to the third fixed contact 7. As mentioned above, in this situation, the movable contact 10 electrically connects the second and third fixed contacts 6, 7 and, consequently, the second pole terminal 12 and the ground terminal 13.

In the switching apparatus of the disclosure, the movable contact 10 may be formed by a shaped piece of conductive material.

The movable contact 10 may be formed by an elongated conductive body centered on the rotation axis A1 and having a first contoured end forming the first movable contact region 10A and a second contoured end (opposite to the first end 10A relative to the rotation axis A1) forming the second movable contact region 10B.

Figure 20:
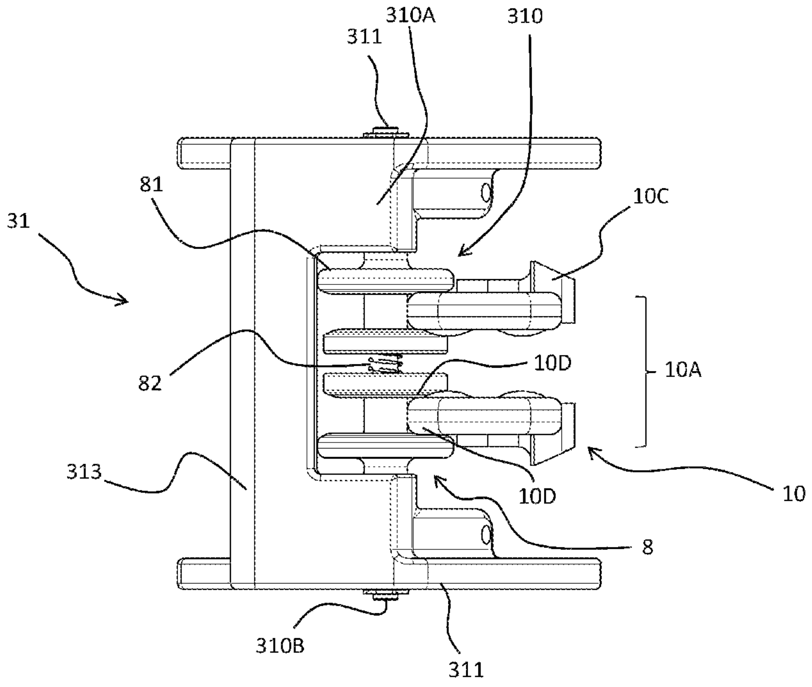

Each movable contact region 10A, 10B of the movable contact 10 may include at least a contact blade, more preferably a pair of parallel contact blades (FIG. 20).

The switching apparatus 1 may include an actuation assembly providing suitable actuation forces to actuate the movable contacts 10 of the electric poles.

Such an actuation assembly may include a motion transmission shaft 9 made of electrically insulating material, which can rotate about the rotation axis A1 and it is coupled to the movable contacts 10 of the electric poles 2.

The motion transmission shaft 9 thus provides rotational mechanical forces to actuate the movable contacts 10 during the maneuvers of the switching apparatus.

The above-mentioned actuation assembly may include an actuator (not shown) coupled to the transmission shaft through a suitable kinematic chain. The actuator may be, for example, a mechanical actuator, an electric motor, or an electromagnetic actuator.

In general, the actuation assembly of the switching apparatus may be realized according to solutions of known type. Therefore, in the following, it will be described only in relation to the aspects of interest of the disclosure, for the sake of brevity.

According to the present disclosure, for each electric pole 2, the switching apparatus 1 includes a vacuum interrupter 20.

The vacuum interrupter 20 includes a fixed arc contact 21 electrically connected to the first fixed contact 5 and, consequently, to the first pole terminal 11.

The fixed arc contact 21 may be formed by an elongated piece of conductive material having one end coupled to the first fixed contact 5 and an opposite free end intended to be coupled to or separated from another arc contact.

The vacuum interrupter 20 includes a movable arc contact 22 reversibly movable along a corresponding translation axis A, which is preferably aligned with a main longitudinal axis of the vacuum interrupter.

The movable arc contact 22 can be coupled to or uncoupled from the fixed arc contact 21, thereby being electrically connected to or electrically disconnected from this latter.

The movable arc contact 22 may be formed by an elongated piece of conductive material having a free end intended to be coupled with or decoupled from the fixed arc contact 21.

The vacuum interrupter 20 includes a vacuum chamber 23, in which a vacuum atmosphere is present.

Conveniently, the fixed arc contact 21 and the movable arc contact 22 are at least partially enclosed in the vacuum chamber 23, so that they have respective contact regions that can be mutually coupled or decoupled inside the vacuum chamber, therefore while being permanently immersed in a vacuum atmosphere.

The vacuum interrupter 20 may include a fixed support structure 25 made of electrically insulating material to hold the vacuum chamber 23 in its operating position.

For each electric pole 2, the switching apparatus 1 includes a motion transmission mechanism 30 operatively coupled to the movable arc contact 22 and actuatable by the movable contact 10 to cause a movement of the movable arc contact 22, when such a movable contact moves about its rotation axis A1.

The motion transmission mechanism 30 includes a first lever 31, a second lever 32, and a third lever 33.

The first lever 31 is pivoted at a first hinge axis H1 and is configured to be actuated by the movable contact 10, during an opening maneuver of the switching apparatus.

The first lever 31 includes a first coupling portion 310 mechanically couplable to the movable contact 10, during an opening maneuver of the switching apparatus (i.e., when said movable contact moves according to the first rotation direction R1), so that the movable contact 10 can actuate the first lever 31.

The second lever 32 is pivoted on a fixed support (may be the fixed support 25 of the vacuum interrupter) at a second hinge axis H2 and it is configured to be actuated by the movable contact 10, during a closing maneuver of said switching apparatus.

The second lever 32 includes a second coupling portion 320 mechanically couplable to the movable contact 10, during a closing maneuver of the switching apparatus (i.e., when said movable contact moves according to the second rotation direction R2), so that the movable contact 10 can actuate the second lever 32.

The third lever 33 is pivoted on the first lever 31 at the first hinge axis H1 and is pivoted on the movable arc contact 22 at a third hinge axis H3. The third lever 33 is configured to be actuated by the first lever 31, during an opening or closing maneuver of the switching apparatus.

In particular, the third lever 33 is actuated by the first lever 31, when said first lever is actuated by the movable contact 10, during an opening maneuver of the switching apparatus, and when said first lever is actuated by the second lever 32, during a closing maneuver of the switching apparatus.

The third lever 33 is configured to actuate the movable arc contact 22 in response to the actuation by the first lever 31.

Conveniently, the above-mentioned hinge axes H1, H2, H3 of the levers 31, 32, 33 are parallel to the rotation axis A1 of the movable contact 10.

According to an aspect of the disclosure, the first lever 31 is configured to actuate the second lever 32, when the first lever 31 is actuated by the movable contact 10, during an opening maneuver of said switching apparatus.

To this aim, the first lever 31 may include one or more first coupling surfaces 312 configured to couple with one or more corresponding second coupling surfaces 322 of the second lever 32, when the first lever 31 moves (by rotating about the first hinge axis H1) in response to the actuation by the movable contact 10 (FIGS. 3-7).

When the first and second mechanical coupling surfaces 312, 322 are coupled, the first lever 31 actuates the second lever 32, which can thus move together with the first lever 31 in response to the actuation by the movable contact 10. In practice, the first and second levers 31, 32 move as a single body actuated by the movable contact 10 as soon as the first and second mechanical coupled surfaces 312, 322 are coupled.

The first lever 31 is configured to couple and actuate the second lever 32 only after having rotated of a given angle about the first hinge axis H1, upon actuation by the movable contact 10. To this aim, before the actuation by the movable contact 10 during an opening maneuver of the switching apparatus, the first and second levers 31, 32 are mutually positioned, so that the first and second coupling surfaces 312, 322 of the first and second levers 31, 32 are oriented along intersecting planes forming a certain angle (for example 30°).

According to another aspect of the present disclosure, the second lever 32 is configured to actuate the first lever 31, when said second lever is actuated by the movable contact 10, during a closing maneuver of said switching apparatus. To this aim, the second lever 32 is hinged on the first lever 31 at the first hinge axis H1 (as shown in the cited figures). The first and second levers 31, 32 thus move together, when the second lever 32 is actuated by the movable contact 10.

As an alternative, the first and second levers 31, 32 may be hinged at a different hinge axis provided that this latter is distinct from the second hinge axis H2, about which the second lever 32 rotates, when it is actuated by the movable contact 10.

As a further alternative, the second lever 32 may include one or more third mechanical coupling surfaces (not shown) configured to couple with corresponding one or more fourth mechanical coupling surfaces (not shown) of the first lever 31, when the second lever 32 moves (by rotating about the second hinge axis H2) in response to the actuation by the movable contact 10.

According to another aspect of the present disclosure, the first and second levers 31, 32 are configured to be alternatively actuated by the movable contact 10, respectively during an opening maneuver and a closing maneuver of the switching apparatus, at different points of the motion trajectory of said movable contact.

In practice, the first and second levers 31, 32 are configured so that their first and second coupling portions 310, 320 intersect alternatively the motion trajectory of the movable contact 10 at different points of said motion trajectory, depending on the configuration taken by the motion transmission mechanism 30, during an opening maneuver and closing maneuver of the switching apparatus.

The mechanical connections between the above-illustrated components of the motion transmission mechanism 30 may be realized according to known solutions, e.g., through pins, screws, rivets, and the like.

In general, the levers 31, 32, 33 are conveniently made of electrically insulating material.

Figure 17:
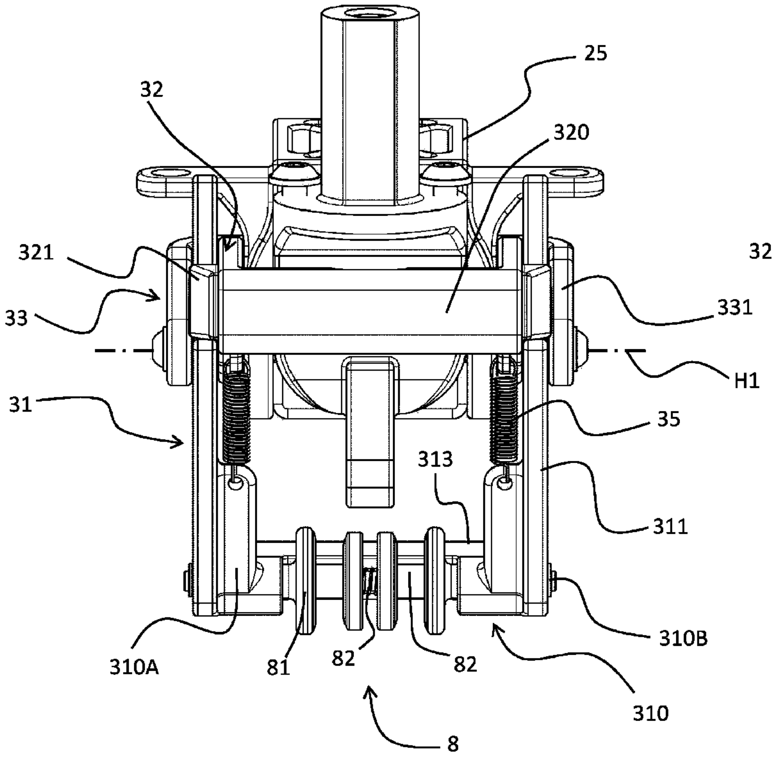

In the embodiment shown in the cited figures, the first lever 31 is formed by a cradle-shaped body of electrically insulating material including a pair of first lever arms 311 (e.g., having a polygonal shape) arranged in parallel at opposite sides of the vacuum chamber 23 and joined transversally by a first reinforcement bridge 313 (FIGS. 17, 20).

The first lever arms 311 are hinged to the second and third levers 32, 33 at the first hinge axis H1.

Each first lever arm 311 includes a side edge including an above-mentioned first coupling surface 312 of the first lever 31 (FIGS. 3-7, 9-14).

The above-mentioned first coupling portion 310 of the first lever 31 is arranged transversally to the first lever arms 311 at corresponding free sides of said first lever arms, may be in proximity of the first reinforcement bridge 313.

The first coupling portion 310 includes opposite first protrusions 310A protruding from mutually facing surfaces of the first lever arms 311 and a support pin 310B arranged between said first lever arms, preferably in parallel to the first reinforcement bridge 313 and passing through the first protrusions 310A (FIGS. 17, 20).

The support pin 310B is configured to couple mechanically to the movable contact 10 (namely to its contact blades) and be actuated by said movable contact, during an opening maneuver of the switching apparatus.

In the embodiment shown in the cited figures, the second lever 32 is formed by a body of electrically insulating material including a pair of second lever arms 321 (e.g., having an elongated shape) arranged in parallel at opposite sides of the vacuum chamber 23.

The second lever arms 321 are hinged to a fixed support 25 at the second hinge axis H2 and to the first lever 31 at the first hinge axis H1.

Each second lever arm 321 includes a second protrusion 321A including an above-mentioned second coupling surface 322 of the second lever 32 (FIGS. 3-7, 9-14).

The above-mentioned second coupling portion 320 of the second lever 32 is arranged transversally to the second lever arms 321 at corresponding free ends of said second lever arms and it is formed by a second reinforcement bridge between the parallel second lever arms 321 (FIG. 17). The second reinforcement bridge 320 is configured to couple mechanically to the movable contact 10 (namely to the contact blades of this latter), during a closing maneuver of the switching apparatus.

In the embodiment shown in the cited figures, the third lever 33 is formed by a U-shaped body of electrically insulating material having elongated third lever arms 331 arranged in parallel at opposite sides of the vacuum chamber 23 (FIG. 17).

The third lever arms 331 have free ends hinged to the first lever 31 at the first hinge axis H1.

In a distal position from said free ends, the third lever arms 331 are hinged to the movable arc contact 22 at the third hinge axis H3 (FIGS. 3-7, 16, 19).

An essential feature of the present disclosure consists in that the first lever 31 includes, at the first coupling portion 310, a contact arrangement 8, which is electrically connected to the movable arc contact 22 of the vacuum interrupter and which is electrically couplable to the movable contact 10, when this latter mechanically couples to the first coupling portion 310, during an opening maneuver of the switching apparatus.

In practice, the auxiliary contact arrangement 8 is configured to connect electrically the movable contact 10 to the movable arc contact 22 of the vacuum interrupter, when the first lever 31 is actuated by the movable contact 10, during an opening maneuver of the switching apparatus.

The auxiliary contact arrangement 8 may include a plurality of conductive elements 81 configured to be slidingly coupled to corresponding contact surfaces 10D of the movable contact 10 (may be of the contact blades of this latter) and holding means 82 configured to press the electric contact elements 81 against the contact surfaces 10D of the movable contact 10.

In the embodiment shown in the cited figures, the above-mentioned conductive elements 81 are formed by one or more pairs of conductive rollers mechanically coupled to the support pin 310B of the first lever 31 and arranged coaxially to said support pin. Each pair of conductive rollers 81 is configured to couple slidingly with a contact surface 10D of the movable contact 10 (may be a corresponding contact blade thereof), when said movable contact mechanically couples to the first lever 31. In this way, an electric contact between the auxiliary contact arrangement 8 and the movable contact 10 is established (FIG. 20).

The above-mentioned holding means 82 are formed by suitably spacers and springs arranged between the above-mentioned conductive rollers 81. The spacers and the springs 82 are mechanically coupled to the support pin 310B and arranged coaxially to this latter. The spacers and the compression springs 82 can thus exert a force on the conductive rollers 81, which is directed in such a way to press said rollers against the corresponding contact surfaces 10D of the contact blades of the movable contact 10 (FIG. 20).

As mentioned above, the auxiliary contact arrangement 8 is electrically connected to the movable arc contact 22.

The first and third levers 31, 33 may include, respectively, first electrical connections 83 and second electrical connections 84 configured to connect electrically the auxiliary contact arrangement 8 and the movable arc contact 22.

Figure 16:
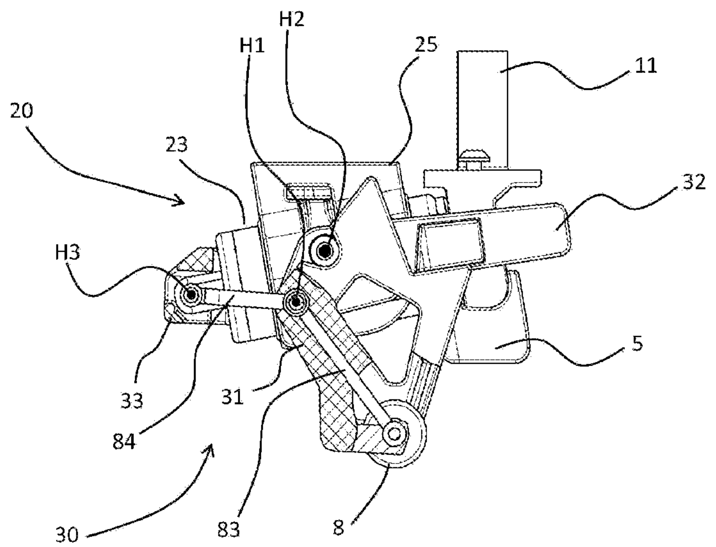
FIGS. 16-20 are schematic views showing some structural details of a motion transmission mechanism of the switching apparatus, according to the present disclosure.
Figure 18:
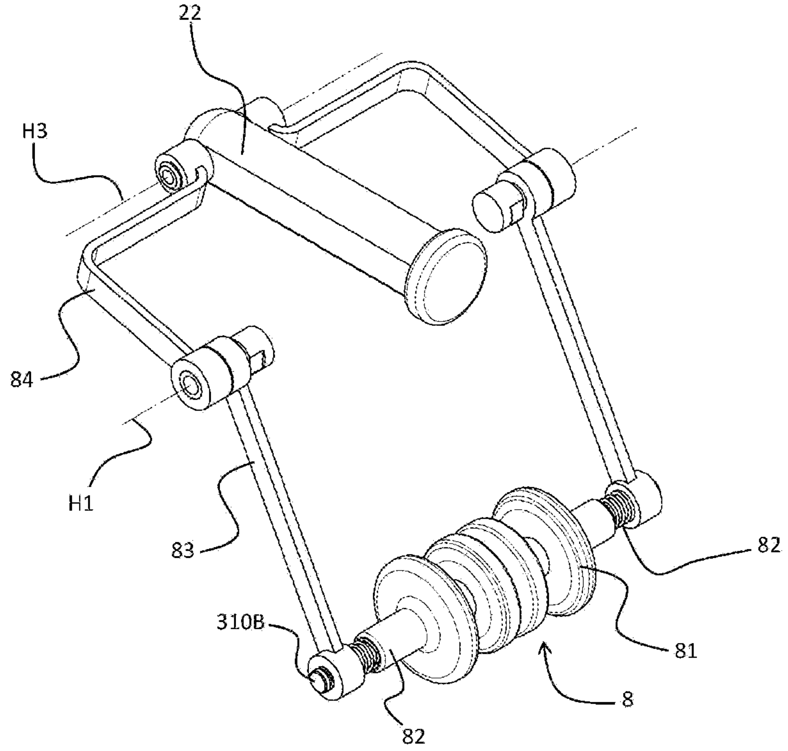
Figure 19:
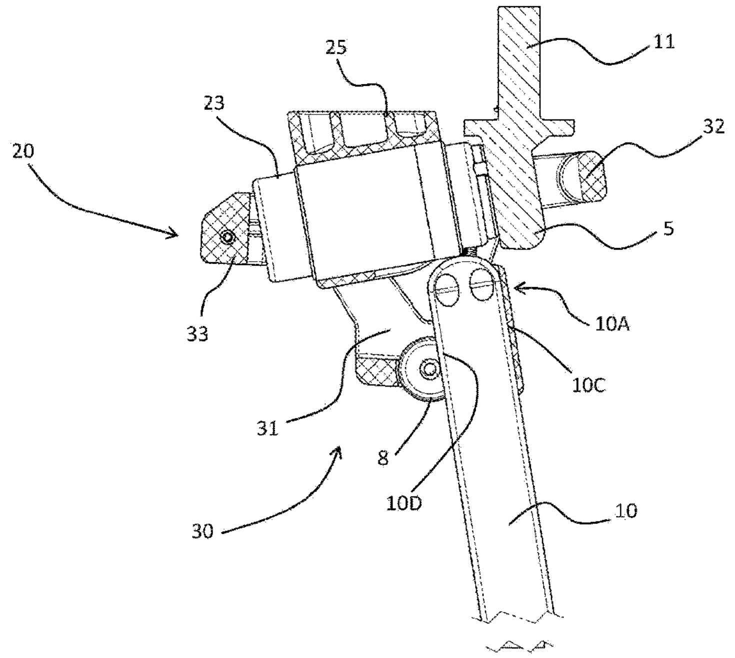

The above-mentioned first and second electrical connections 83, 84 may be formed by conductors at least partially buried in the electrically insulating material of the first and third levers 31, 33 (FIGS. 16 and 18). This solution is particularly useful as it simplifies the arrangement of the motion transmission mechanism 30.

In the embodiment shown in the cited figures, the first electrical connections 83 include first conductors buried in the first lever arms 311 of the first lever 31 and electrically connected to the conductive elements 81 of the auxiliary contact arrangement 8 (e.g., through the conductive support pin 310B). The second electrical connections 84 instead include second conductors buried in the third lever arms 331 of the third lever 33 and electrically connected to the first conductors 83 (e.g., through suitable conductive pins at the first hinge axis H1) and to the movable arc contact 22 (e.g., through suitable conductive pins at the third hinge axis H3).

According to another aspect of the present disclosure, the motion transmission mechanism 30 includes elastic means 35 mechanically coupling the first and second levers 31, 32.

The elastic means 35 are particularly useful to damp the mechanical impact of the movable contact 10 on the first lever 31, when said movable contact mechanically couples to the first coupling portion 310 of the first lever 31, during an opening maneuver of the switching apparatus.

The elastic means 35 additionally favor the correct relative positioning of the first and second levers 31, 32, when the movable contact 10 mechanically decouples from the first coupling portion 310 of the first lever 31 and stops actuating said first lever, during an opening maneuver of the switching apparatus.

The elastic means 35 may include one or more springs arranged between the first and second levers 31, 32.

In the embodiment shown in the cited figures, the elastic means 35 include a pair of springs, each mechanically coupled between a corresponding first lever arm 311 of the first lever 31 and a corresponding second lever arm 321 of the second lever 32.

As mentioned above, the second lever 32 is configured to be actuated by the movable contact 10, during a closing operation of the switching apparatus.

The movable contact 10 may include, at the first movable contact region 10A, one or more coupling members 10C configured to couple mechanically to the second lever 32, during a closing operation of the switching apparatus.

In the embodiment shown in the cited figures, each coupling member 10C is formed by an elongated conductive pad solidly coupled of a corresponding contact blade of the movable contact 10, at an outer surface of said contact blade (FIGS. 3-7, 9-14, 20). Each conductive pad 10C is configured to couple mechanically to a third protrusion 320A of a correspond second lever arm 321 of the second lever 32.

According to example embodiments of the disclosure, the motion transmission mechanism 30 is configured to take alternatively a first configuration C1 and a second configuration C2.

The first configuration C1 of the motion transmission mechanism 30 corresponds to a closed condition of the vacuum interrupter 20, in the sense that, when the motion transmission mechanism takes this configuration, the movable arc contact 22 is in a coupled position P3 with the fixed arc contact 21.

The second configuration C2 of the motion transmission mechanism 30 instead corresponds to an open condition of the vacuum interrupter 20, in the sense that, when the motion transmission mechanism takes this configuration, the movable arc contact 22 is in an uncoupled position P4 from the fixed arc contact 21.

The motion transmission mechanism 30 is configured to maintain stably the first configuration C1 or the second configuration C2, if the lever arms 311, 312 of each lever 31, 32 are not actuated by the movable contact 10.

Instead, the motion transmission mechanism 30 is configured to switch its configuration, upon an actuation of the first lever 31 or second lever 32 by the movable contact 10.

Any transition of configuration of the motion transmission mechanism 30 causes a corresponding movement of the movable arc contact 22 and a consequent change of condition of the vacuum interrupter 20.

The motion transmission mechanism 30 is configured to switch from the first configuration C1 to the second configuration C2 upon an actuation of the first lever 31 by the movable contact 10 at a first point of the motion trajectory of the movable contact 10, while this latter is moving according to the first rotation direction R1, during an opening maneuver of the switching apparatus.

The transition of the motion transmission mechanism 30 from the first configuration C1 to the second configuration C2 causes a corresponding movement of the movable arc contact 22 from the coupled position P3 to the uncoupled position P4.

The motion transmission mechanism 30 is configured to switch from the second configuration C2 to the first configuration C1 upon an actuation by the movable contact 10 at a second point of the motion trajectory of the movable contact 10, while this latter is moving according to the second rotation direction R2, during a closing maneuver of the switching apparatus.

The transition of the motion transmission mechanism 30 from the second configuration C2 to the first configuration C1 causes a corresponding movement of the movable arc contact 22 from the uncoupled position P4 to the coupled position P3.

The mechanical behavior of the motion transmission mechanism 30 and its mechanical interaction with the movable arc contact 22 is briefly described in the following with reference to FIGS. 3-7 and 9-14.

Transition from the First Configuration C1 to the Second Configuration C2

Figure 3:
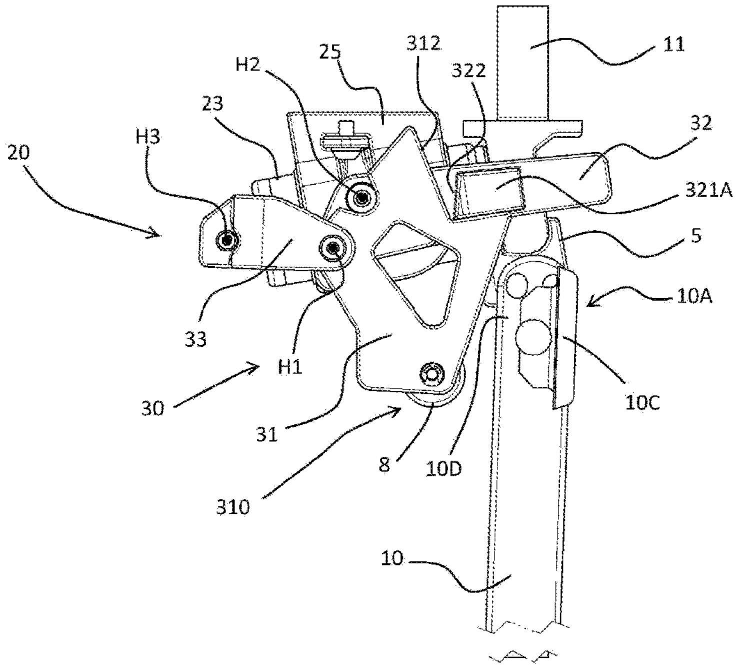
Figure 4:
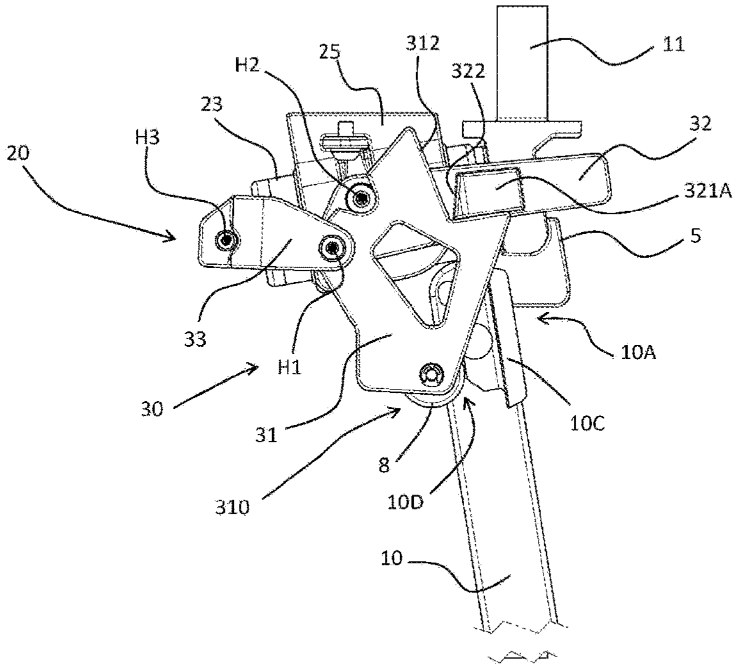

FIGS. 3-4 show the motion transmission mechanism 30 in the first configuration C1.

The first and third levers 31, 33 are relatively positioned one to another, so that the motion transmission mechanism 30 does not exert any force on the movable arc contact shaft 22.

The first coupling surfaces 312 of the first lever 31 are decoupled from the second coupling surfaces 321 of the second lever 32.

The first hinge axis H1 between the first and third levers 31, 33 is in a first position, at which the movable arc contact 22 is in the coupled position P3 with the fixed arc contact 21. The first hinge axis H1 is not aligned with the fixed hinge axes H2, H3 of the second and third levers 32, 33.

Upon actuation of the first lever 31 by the movable contact 10, while said movable contact is rotating according to the first rotation direction R1, the first lever 31 rotates relative to the second lever 32 (according to a clockwise direction taking as a reference the observation plane of FIGS. 3-7).

At this initial stage, the third lever 33 does not substantially move and the motion transmission mechanism 30 does not exert a force on the movable arc contact 22, which remains in the coupled position P3 with the fixed arc contact 21 (FIGS. 3-4).

The elastic means 35 between the first and second levers 31, 32 exert a damping action of the force applied by the movable contact 10 on the first lever 31.

As soon as the first lever 31 rotates for a given angle, the first coupling surfaces 312 of the first lever 31 couple to the second coupling surfaces 321 of the second lever 32.

The first lever 31 actuates the second lever 32 and the first and second levers 31, 32 start rotating together about the second hinge axis H2 (with a same clockwise direction) as they were a single body actuated by the movable contact 10.

At the same time, the first lever 31 and the third lever 33 rotate according to opposite directions (counter-clockwise and clockwise, respectively) about the first hinge axis H1. The third lever 33 rotates about the third hinge axis H3 (with clockwise direction).

The first hinge axis H1 between the first and third levers 31, 33 starts moving away from the above-mentioned first position and it travels towards a second position (FIG. 5), at which the movable arc contact 22 is coupled with the fixed arc contact 21.

The motion transmission mechanism 30 starts exerting a force on the movable arc contact 22, which is directed to decouple this latter from the fixed arc contact 21. The movable arc contact 22 thus starts moving away from the fixed arc contact 21 notwithstanding the vacuum attraction force generated by the vacuum atmosphere in the vacuum chamber.

Figure 5:
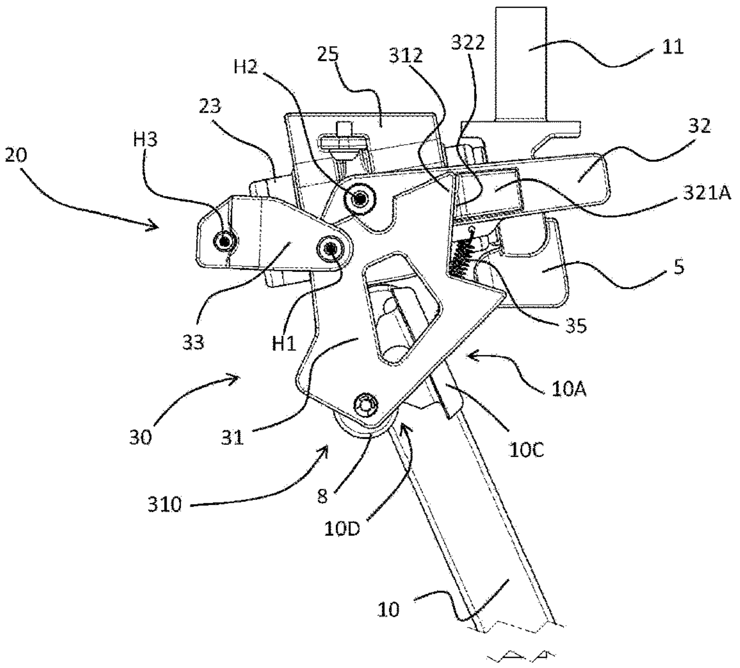
Figure 6:
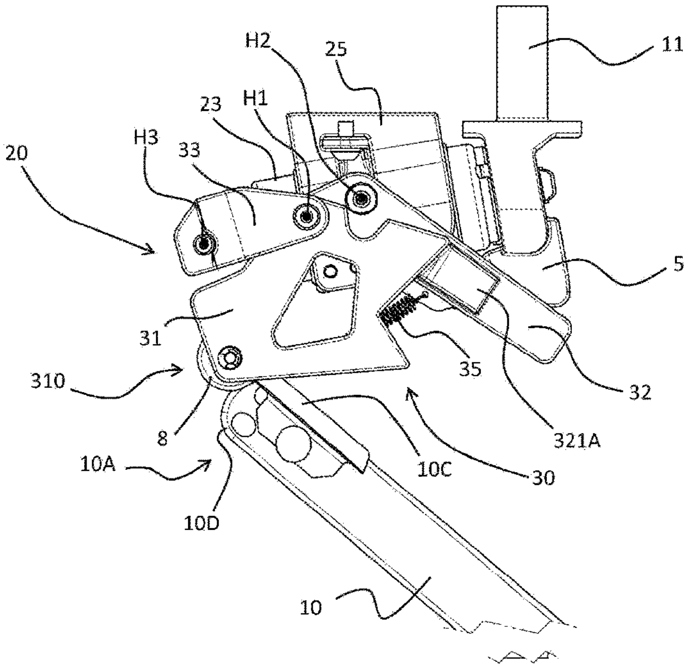

While it is travelling towards the above-mentioned second position, the first hinge axis H1 between the first and third levers 31, 33 passes through an intermediate deadlock position, which can be defined as the position, in which the first hinge axis H1 is aligned with the hinge axes H2 and H3 and the second and third levers 32, 33 (FIGS. 5-6).

Upon actuation of the first lever 31 by the movable contact 10, the first, second and third levers 31, 32, 33 continue to rotate as explained above.

The movable arc contact 22 continues to move away from the fixed arc contact 21 and it reaches the maximum distance from the fixed arc contact 21, when the first hinge axis H1 between the second and third levers 32, 33 reaches the intermediate deadlock position, while moving away from the above-mentioned first position (FIG. 6).

As soon as the first hinge axis H1 passes beyond the intermediate deadlock position, the motion transmission mechanism 30 stops exerting a force on the movable arc contact 22.

The movable arc contact 22 slightly moves back towards the fixed arc contact 21 due to the attraction force by the vacuum atmosphere in the vacuum chamber 23.

In the meanwhile, the movable contact 10 decouples from the first lever 31 and stops actuating this latter.

Due to the force exerted by the elastic means 35 and the vacuum attraction exerted on the third lever 33, the first and second levers 31, 32 rotate relatively one to another according to opposite directions. In this way, the first coupling surfaces 312 of the first lever 31 decouple from the second coupling surfaces 321 of the second lever 32. In practice, the first and second levers 31, 32 return in their initial relative position taken before the movable contact 10 actuated the first lever 31.

At the end, the first hinge axis H1 between the first and third levers 31, 33 reaches the above-mentioned second position (FIG. 7) and the movable arc contact 22 reaches the uncoupled position P4 from the fixed arc contact 21, which is stably maintained due to the force exerted on the movable arc contact 22 by the motion transmission mechanism 30, which opposes to the vacuum attraction force.

Transition from the Second Configuration C2 to the First Configuration C1

Figure 12:
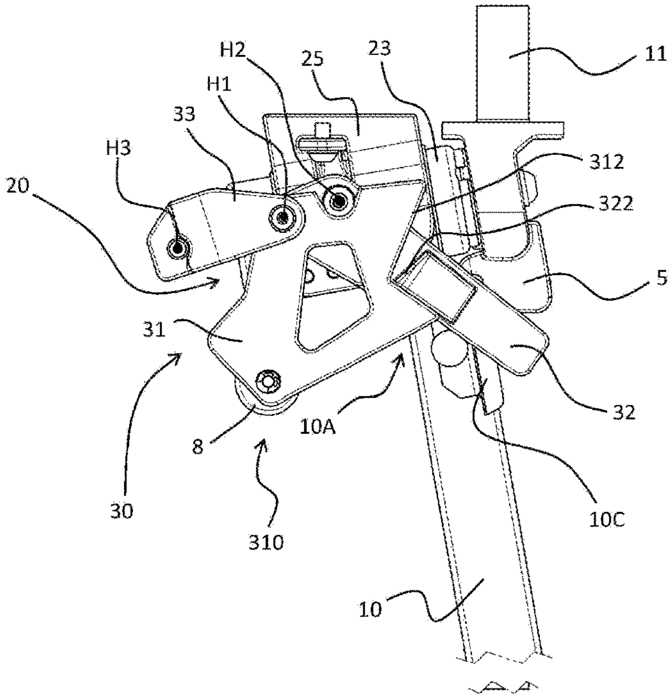
Figure 13:
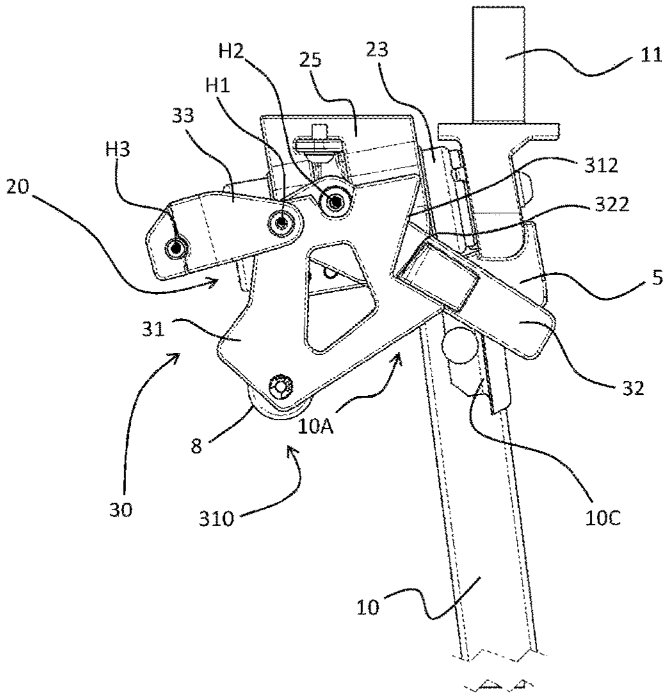
Figure 14:
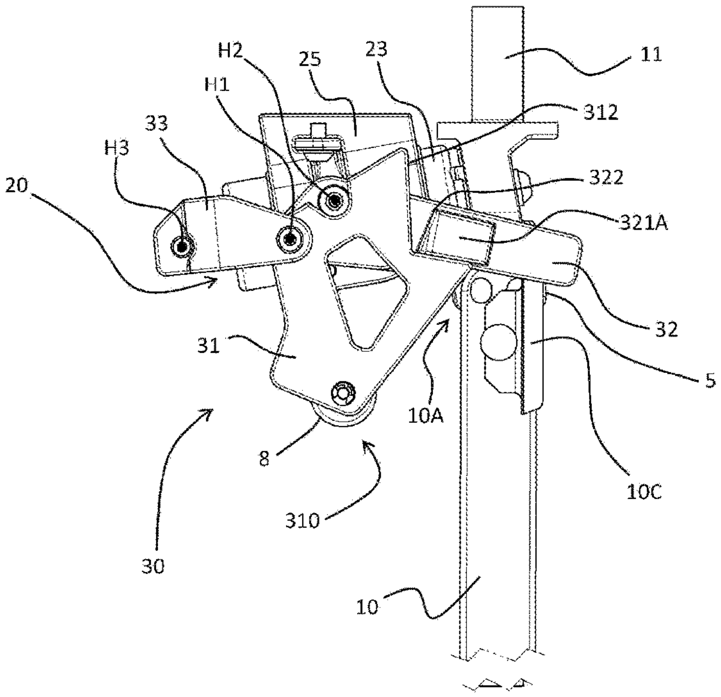

FIGS. 12-13 show the motion transmission mechanism 30 in the second configuration C2.

The first and third levers 31, 33 are relatively positioned one to another, so that the motion transmission mechanism 30 exerts a force on the movable arc contact 22, which is directed to maintain this latter uncoupled from the fixed arc contact 21.

The first hinge axis H1 between the first and third levers 31, 33 is in the above-mentioned second position, at which the movable arc contact 22 is in the uncoupled position P4 from the fixed arc contact 21.

The first hinge axis H1 is not aligned with the hinge axes H2, H3.

Upon actuation of the second lever 32 by the movable contact 10, the second lever 32 rotates about the second hinge axis H2 (according to a counter-clockwise direction taking as a reference the observation plane of FIGS. 8-14) and actuates the first lever 31 as the first and second levers are hinged at the first hinge axis H1.

The first and second levers 31, 32 start rotating together about the second hinge axis H2 (about a same counter-clockwise direction) as they were a single body actuated by the movable contact 10. In this case, the first and second levers 31, 32 do not move relatively one to another.

In the meanwhile, the third lever 33 starts rotating about the third hinge axis H3 (according to an opposite clockwise direction).

The first hinge axis H1 between the first and third levers 31, 33 moves away from the above-mentioned second position and it travels towards the above-mentioned first position.

The motion transmission mechanism 30 starts exerting a force on the movable arc contact 22, which is directed to move away this latter from the fixed arc contact 21.

The movable arc contact 22 thus initially moves away from the fixed arc contact 21 notwithstanding the vacuum attraction force generated by the vacuum atmosphere in the vacuum chamber and it reaches the maximum distance from the fixed arc contact 21, when the first hinge axis H1 between the first and third levers 31, 33 reaches the intermediate deadlock position, while moving away from the above-mentioned second position.

As soon as the first hinge axis H1 passes beyond the intermediate deadlock position, the motion transmission mechanism 30 stops exerting a force on the movable arc contact 22.

The movable arc contact 22 starts moving towards the fixed arc contact 21 due to the vacuum attraction force.

In the meanwhile, the movable contact 10 separates from the second lever 32 and stops actuating this latter.

Due to the vacuum attraction force exerted on the third lever 33, the first, second and third levers 31, 32, 33 continue their movement. At the end, the first hinge axis H1 between the first and third levers 31, 33 reaches the above-mentioned second position (FIG. 3) and the movable arc contact 22 reaches the coupled position P3 with the fixed arc contact 21, which is stably maintained as the motion transmission mechanism 30 does not exert any force on the movable arc contact 22.

The operation of the switching apparatus 1 (with a "double-disconnection" configuration) for each electric pole 2 is now described in more details.

Closed State of the Switching Apparatus

When the switching apparatus is in a closed state, each electric pole 2 is in the operating condition illustrated in FIG. 2.

In this situation, each electric pole 2 has:

- the movable contact 10 in the first end-of-run position $P_A$;
- the movable contact 10 coupled to the first and second fixed contacts 5, 6;
- the first and second fixed contacts 5, 6 electrically connected one to another and electrically disconnected from the third fixed contact 7;
- the motion transmission mechanism 30 in the first configuration C1; and the movable arc contact 22 in a coupled position P3 with the fixed arc contact 21.

The first lever 31 is positioned along the motion trajectory of the movable contact 10 while the second lever 32 is not positioned along the motion trajectory of the movable contact 10.

A current can flow through the electric pole between the first and second pole terminals 11, 12 passing through the first fixed contact 5, the movable contact 10 and the second fixed contact 6. No currents can flow through the vacuum interrupter 20.

Open State of the Switching Apparatus

When the switching apparatus is in an open state, each electric pole 2 is in the condition shown in FIG. 8.

In this situation, each electric pole 2 has:

the movable contact 10 in the intermediate position $P_B$;

the movable contact 10 decoupled from any fixed contact;

the first, second and third fixed contacts 5, 6, 7 electrically disconnected one from another;

the motion transmission mechanism in the second configuration C2; and the movable arc contact 22 in an uncoupled position P4 from the fixed arc contact 21.

The lever 31 is not positioned along the motion trajectory of the movable contact 10 while the second lever 32 is positioned along the motion trajectory of the movable contact 10.

No currents can flow between the first and second pole terminals 11, 12.

Grounded State of the Switching Apparatus

When the switching apparatus is in a grounded state, each electric pole 2 is in the condition illustrated in FIG. 15.

In this situation, each electric pole 2 has:

the movable contact 10 in the second end-of-run position $P_C$;

the movable contact 10 coupled to the second and third fixed contacts 6, 7;

the second and third fixed contacts 6, 7 electrically connected one to another and electrically disconnected from the first fixed contact 5;

the motion transmission mechanism in the second configuration C2; and the movable arc contact 22 in an uncoupled position P4 from the fixed arc contact 21.

The first lever 31 is not positioned along the motion trajectory of the movable contact 10 while the second lever 32 is positioned along the motion trajectory of the movable contact 10.

No currents can flow between the first and second pole terminals 11, 12 and the second pole terminal 12 is put at a ground voltage.

Opening Maneuver

The switching apparatus 1 carries out an opening maneuver, when it switches from the closed state to the open state.

During an opening maneuver of the switching apparatus, the movable contact 10 moves, according to the first rotation direction R1, between the first end-of-run position $P_A$ and the intermediate position $P_B$. The movable contact 10 thus moves away from the corresponding first fixed contact 5.

When moving according to the first rotation direction R1, at a first point of its motion trajectory, the movable contact 10 couples to the coupling portion 310 of the first lever 31 while it is still slidingly coupled to the first fixed contact 5 (FIG. 4).

In this way, the movable contact 10 electrically couples (in a sliding manner) to the auxiliary contact arrangement 8 and it electrically connects both the first fixed contact 5 and the auxiliary contact arrangement 8 to the second fixed contact 6. A current can flow between the first and second pole terminals 11, 12 passing through the first fixed contact 5 and the vacuum interrupter 20 in parallel. Obviously, most of the current will flow along the first fixed contact 5 as the current path passing through this electric contact has a lower equivalent resistance with respect to the current path passing through the vacuum interrupter.

In the meanwhile, the movable contact 10 actuates the first lever 31 and, more in general, the motion transmission mechanism 30.

Upon a further movement according to the first rotation direction R1, the movable contact 10 decouples from the first fixed contact 5 while remaining slidingly coupled to the auxiliary contact arrangement 8 and the second fixed contact 6 (FIG. 5).

The movable contact 10 thus electrically disconnects the first fixed contact 5 from the second fixed contact 6 while maintaining the auxiliary contact arrangement 8 electrically connected with the second fixed contact 6. In this situation, a current flowing along the electric pole is fully deviated through the vacuum interrupter 20 as no current can flow through the first fixed contact 5. The formation of electric arcs at the contact region 10A of the movable contact 10 is thus prevented.

While it is slidingly coupled to the auxiliary contact arrangement 8, the movable contact 10 continues to actuate the first lever 31 (FIG. 5).

The actuation of the first lever 31 by the movable contact 10 causes a transition of the motion transmission mechanism from the first configuration C1 to the second configuration C2 and a consequent movement of the movable arc contact 22 from the coupled position P3 with the fixed arc contact 21 to the uncoupled position P4 from the fixed arc contact 21.

The separation of the electric contacts 21, 22 causes the rising of electric arcs between said electric contacts. However, since the electric contacts 21, 22 are immersed in a vacuum atmosphere, such electric arcs can be quenched efficiently, thereby quickly leading to the interruption of the current flowing along the electric pole.

In the meanwhile, the movable contact 10 maintains the auxiliary contact arrangement 8 electrically connected to the second fixed contact 6, thereby preventing the formation of electric arcs at the contact regions 10A, 10B of the movable contact 10.

Upon a further movement towards the intermediate position $P_B$, according to the first rotation direction R1, the movable contact 10 decouples from the first lever 31.

The movable contact 10 thus electrically decouples from the auxiliary contact arrangement 8, which thus results disconnected from the second fixed contact 6.

Figure 7:
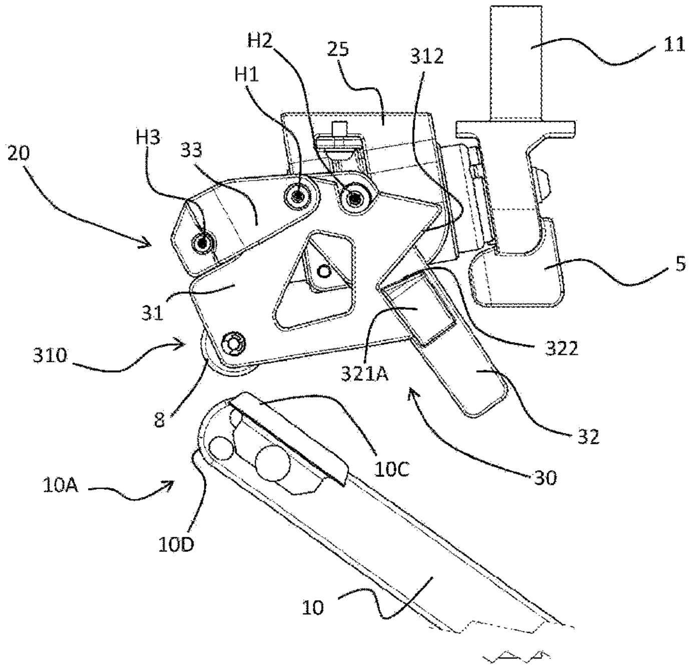

The motion transmission mechanism 30 remains in the second configuration C2 (FIGS. 6-7).

The movable contact 10 then reaches the intermediate position $P_B$, which corresponds to an open state of the switching apparatus (FIG. 8).

Closing Maneuver

The switching apparatus 1 carries out a closing maneuver, when it switches from the open state to the close state.

Before carrying out a closing maneuver, the switching apparatus may have carried out a reconnecting maneuver in order to switch in an open state.

During a closing maneuver of the switching apparatus, the movable contact 10 moves, according to the second rotation direction R2, between the intermediate position $P_B$ and the first end-of-run position $P_A$. The movable contact 10 thus moves towards the corresponding first fixed contact 5 (FIG. 9).

Figure 9:
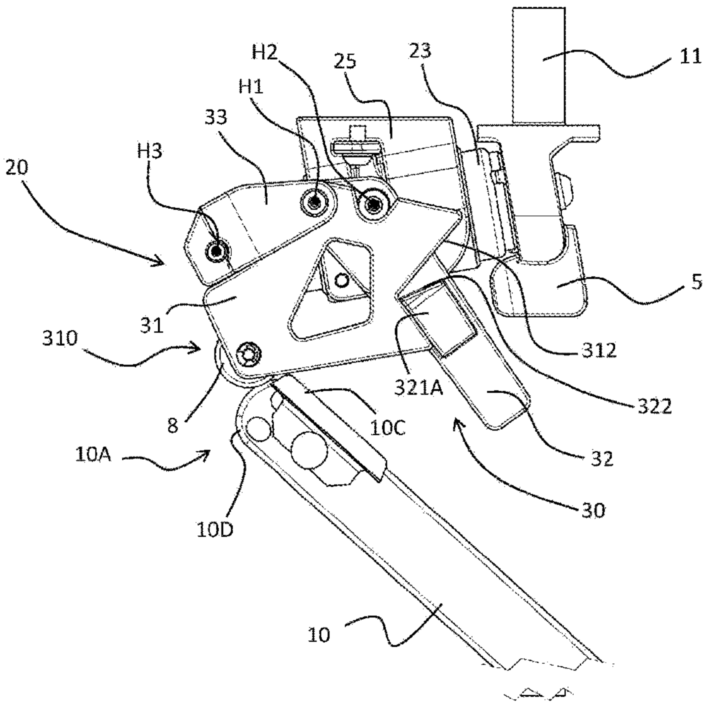
Figure 10:
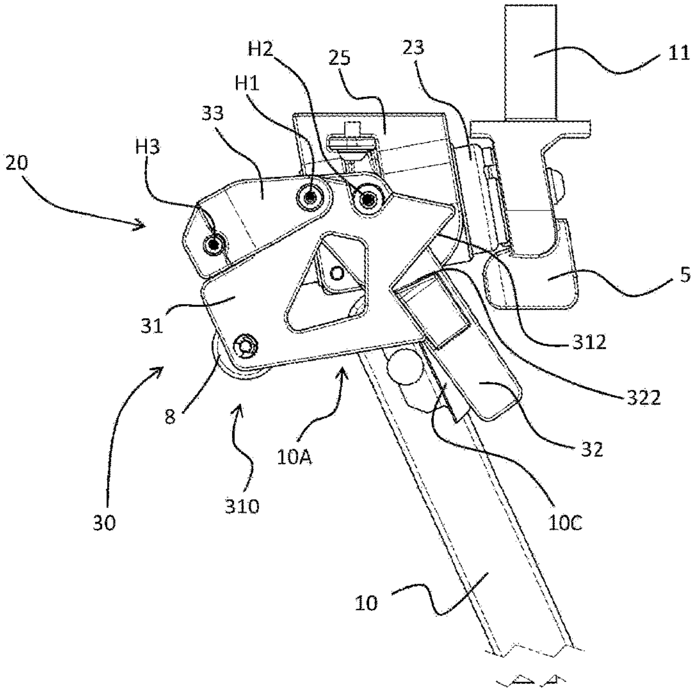

The movable contact 10 does not mechanically couple to the first lever 31 of the motion transmission mechanism 30 (FIGS. 9-10). However, at a second point of its motion trajectory, the movable contact 10 mechanically couples to the coupling portion 320 of the second lever 32 and actuates this latter (FIG. 10).

Figure 11:
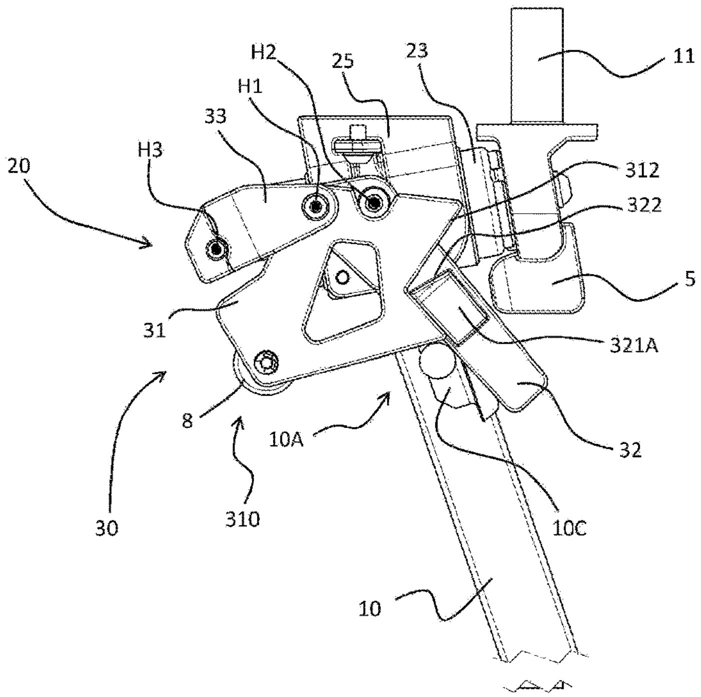

The actuation of the second lever 32 by the movable contact 10 causes a transition of the motion transmission mechanism 30 from the second configuration C2 to the first configuration C1 and a consequent movement of the movable arc contact 22 from the uncoupled position P4 from the fixed arc contact 21 to the coupled position P3 with the fixed arc contact 21 (FIG. 11).

While it is actuating the second lever 32, the movable contact 10 slidingly couples to first fixed contact 5 (FIGS. 12-13), thereby electrically connecting the first and second fixed contacts 5, 6 while the motion transmission mechanism switches from the second configuration C2 to the first configuration C1.

The movable contact 10 finally reaches the first end-of-run position $P_A$, which corresponds to a closed state of the switching apparatus (FIG. 2).

Disconnecting Maneuver

The switching apparatus 1 carries out a disconnecting maneuver, when it switches from an open state to a grounded state.

Obviously, before carrying out a disconnecting maneuver, the switching apparatus has to carry out an opening maneuver as described above in order to switch in an open state.

During a disconnecting maneuver of the switching apparatus, the movable contact 10 moves, according to the first rotation direction R1, between the intermediate position $P_B$ and the second end-of-run position $P_C$.

When it reaches the second end-of-run position $P_C$, the movable contact 10 couples the second fixed contact 6 to the third fixed contact 7, thereby electrically connecting the second fixed contact 6 with the third fixed contact 7 and, consequently, the second pole terminal 12 with the ground terminal 13. The second pole terminal 12 results therefore put at a ground voltage.

The movable contact 10 does not interact with the motion transmission mechanism 30, which remains in the second configuration C2, when the switching apparatus carries out a disconnecting maneuver.

Reconnecting Maneuver

The switching apparatus 1 carries out a reconnecting maneuver when it switches from a grounded state to an open state.

During a reconnecting maneuver of the switching apparatus, the movable contact 10 moves, according to the second rotation direction R2, between the second end-of-run position $P_C$ and the intermediate position $P_B$.

In this way, the first movable contact 10 decouples from the second fixed contact 6 and from the third fixed contact 7, thereby electrically disconnecting the movable contact from the third fixed contact 7. As a consequence, the movable contact 10 does not electrically connect the second pole terminal 12 with the ground terminal 13 anymore. The second pole terminal 12 therefore results at a floating voltage.

The movable contact 10 does not interact with the motion transmission mechanism 30, which remains in the second configuration C2, when the switching apparatus carries out a reconnecting maneuver.

As it is apparent from the above, the operation of the switching apparatus occurs according to similar operating modes, if the switching apparatus is of the "single-disconnection" type.

The switching apparatus, according to the disclosure, provides remarkable advantages with respect to the known apparatuses of the state of the art.

The switching apparatus of the disclosure includes, for each electric pole, a bistable motion transmission mechanism 30, which allows the movable contact 10 to drive the separation of the movable arc contact 22 from the fixed arc contact 21 depending on the position reached during an opening maneuver of the switching apparatus.

As illustrated above, the levers 31, 32 of the motion transmission mechanism 30 are actuatable at different points of the motion trajectory of the movable contact 10. This solution improves the synchronization between the movement of the movable arc contact 22 and the movement of the movable contact 10.

In this way, the breaking process of the current flowing along each electric pole can be easily made to occur at level of the arc contacts 21, 22 accommodated in the vacuum chamber 23. Possible electric arcs, which derive from the interruption of a current flowing along each electric pole, therefore form in a vacuum atmosphere only, which allows improving their quenching process.

The circumstance that the motion transmission mechanism 30 can stably take two different configurations further improves synchronization between the movements of the movable arc contact 22 and the movable contact 10, during the opening and closing maneuvers of the switching apparatus.

The switching apparatus of the disclosure has electric poles with a very compact, simple, and robust structure with relevant benefits in terms of size optimization.

The switching apparatus, according to the present disclosure, ensures high-level performances in terms of dielectric insulation and arc-quenching capabilities during the current breaking process and, at the same time, it is characterized by high levels of reliability for the intended applications.

The switching apparatus, according to the disclosure, is of relatively easy and cheap industrial production and installation on the field.

What is claimed is:

1. A switching apparatus for medium voltage electric systems, the switching apparatus comprising one or more electric poles, wherein, for each electric pole, the switching apparatus comprises:

a first pole terminal, a second pole terminal, and a ground terminal, wherein the first pole terminal is electrically couplable to a first conductor of an electric line, wherein the second pole terminal is electrically couplable to a second conductor of the electric line, and wherein the ground terminal is electrically couplable to a grounding conductor;

a plurality of fixed contacts spaced apart one from another, the plurality of fixed contacts comprising a first fixed contact electrically connected to the first pole terminal, a second fixed contact electrically connected to the second pole terminal, and a third fixed contact electrically connected to the ground terminal;

a movable contact reversibly movable about a corresponding rotation axis according to opposite first and second rotation directions, so that the movable contact can be coupled to or uncoupled from the fixed contacts;

a vacuum interrupter comprising a fixed arc contact electrically connected to the first pole terminal, a movable arc contact reversibly movable along a corresponding translation axis between a coupled position with the fixed arc contact and an uncoupled position from the fixed arc contact, and a vacuum chamber, in which the fixed arc contact and the movable arc contact are enclosed and can be coupled or decoupled; and a motion transmission mechanism operatively coupled to the movable arc contact, the motion transmission mechanism actuatable by the movable contact to cause a movement of the movable arc contact along the translation axis, when the movable contact moves about the rotation axis;

wherein the motion transmission mechanism comprises:

a first lever pivoted at a first axis and configured to be actuated by the movable contact, during an opening maneuver of the switching apparatus, wherein the first lever comprises a first coupling portion mechanically couplable to the movable contact, wherein the first lever comprises, at the first coupling portion, an auxiliary contact arrangement electrically connected to the movable arc contact and electrically couplable to the movable contact, when the movable contact mechanically couples to the first coupling portion;

a second lever pivoted on a fixed support at a second hinge axis and configured to be actuated by the movable contact, during a closing maneuver of the switching apparatus, wherein the second lever comprises a second coupling portion mechanically couplable to the movable contact; and a third lever pivoted on the first lever at the first hinge axis and pivoted on the movable arc contact at a third hinge axis.

2. The switching apparatus according to claim 1, wherein the first lever is configured to actuate the second lever, when the first lever is actuated by the movable contact, during the opening maneuver of the switching apparatus.

3. The switching apparatus according to claim 2, wherein the first lever comprises one or more first coupling surfaces configured to couple mechanically to one or more corresponding second coupling surfaces of the second lever, when the first lever is actuated by the movable contact, during the opening maneuver of the switching apparatus.

4. The switching apparatus according to claim 1, wherein the second lever is configured to actuate the first lever, when the second lever is actuated by the movable contact, during the closing maneuver of the switching apparatus.

5. The switching apparatus according to claim 4, wherein the second lever is hinged on the first lever at the first hinge axis.

6. The switching apparatus according to claim 1, wherein the first and second levers are configured to be actuated by the movable contact, at different points of a motion trajectory of the movable contact.

7. The switching apparatus according to claim 1, wherein the motion transmission mechanism further comprises at least one spring mechanically coupling the first and second levers.

8. The switching apparatus according to claim 1, wherein the auxiliary contact arrangement comprises a plurality of conductive elements configured to be slidingly coupled with corresponding contact surfaces of the movable contact and spacers and springs configured to press the conductive elements against the contact surfaces of the movable contact.

9. The switching apparatus according to claim 1, wherein the first lever and the third lever comprise, respectively, first electrical connections and second electrical connections configured to connect electrically the auxiliary contact arrangement with the movable arc contact, said first and second electrical connections formed by conductors at least partially buried in an electrically insulating material of the first and third levers.

10. The switching apparatus according to claim 1, wherein the motion transmission mechanism is configured to take a first configuration, at which the movable arc contact is in the coupled position, and a second configuration, at which the movable arc contact is in the uncoupled position, wherein the motion transmission mechanism is configured to maintain stably the first configuration or the second configuration, if the first and second levers are not actuated by the movable contact, and wherein the motion transmission mechanism is configured to change configuration, if the first lever or the second lever is actuated by the movable contact.

11. The switching apparatus according to claim 10, wherein the motion transmission mechanism is configured to switch from the first configuration to the second configuration upon an actuation of the first lever by the movable contact, a transition of the motion transmission mechanism from the first configuration to the second configuration causing a movement of the movable arc contact from the coupled position to the uncoupled position.

12. The switching apparatus according to claim 11, wherein the motion transmission mechanism is configured to switch from the second configuration to the first configuration upon an actuation of the second lever by the movable contact, wherein a transition of the motion transmission mechanism from the second configuration to the first configuration causes a movement of the movable arc contact from the uncoupled position to the coupled position.

13. The switching apparatus according to claim 10, wherein the motion transmission mechanism is configured to switch from the second configuration to the first configuration upon an actuation of the second lever by the movable contact, wherein a transition of the motion transmission mechanism from the second configuration to the first configuration causes a movement of the movable arc contact from the uncoupled position to the coupled position.

14. The switching apparatus according to claim 1, wherein the movable contact comprises one or more contact blades.

15. The switching apparatus according to claim 1, wherein the switching apparatus is a load-break switch for medium voltage electric systems.

* * * * *